United States Patent [19]

Halwani

[11] Patent Number: 5,405,211

[45] Date of Patent: Apr. 11, 1995

[54] LIGHTWEIGHT BLOCK CONTAINING STABILIZED WOOD AGGREGATES

[75] Inventor: Fouad Halwani, Kirkland, Canada

[73] Assignee: Agrestech Industries LTEE, Quebec, Canada

[21] Appl. No.: 49,502

[22] Filed: Apr. 21, 1993

[51] Int. Cl.$^6$ .............................................. E01C 5/22
[52] U.S. Cl. ........................................ 404/46; 404/36; 106/805
[58] Field of Search ............... 106/654, 687, 726, 745, 106/753, 805, 819, 902, 653; 404/34, 46, 35, 36

[56] References Cited

U.S. PATENT DOCUMENTS

| | | | |
|---|---|---|---|
| 2,854,344 | 9/1958 | Comisso | 404/34 X |
| 3,504,472 | 4/1970 | Clement | 404/34 X |
| 4,043,826 | 8/1977 | Hum | 106/90 |
| 4,073,848 | 2/1978 | Kuehn | 264/120 |
| 4,113,913 | 9/1978 | Smiley | 106/88 X |
| 4,390,568 | 6/1983 | Schwenk et al. | 427/234 |
| 4,514,947 | 5/1985 | Grail | 52/536 |
| 4,528,037 | 7/1985 | Guidat | 106/81 |
| 5,019,170 | 5/1991 | Walter et al. | 106/805 |
| 5,028,299 | 7/1991 | Guidat et al. | 162/24 |
| 5,106,557 | 4/1992 | Rirsch et al. | 264/118 |
| 5,167,991 | 12/1992 | Lowe | 427/267 |

FOREIGN PATENT DOCUMENTS

| | | |
|---|---|---|
| 1171264 | 7/1984 | Canada . |
| 1203991 | 5/1986 | Canada . |
| 241405 | 9/1989 | Japan . |

*Primary Examiner*—Ramon S. Britts
*Assistant Examiner*—James A. Lisehora
*Attorney, Agent, or Firm*—Burns, Doane, Swecker & Mathis

[57] ABSTRACT

A lightweight block useful as a patio tile, a border piece or a landscaping component, which has a density of 800 to 1,200 kg/m$^3$ and is made from a concrete mix comprising stabilized wood aggregates prepared by sterilization of wood chips by thermal treatment, followed by a chemical treatment with a calcium salt first and then with at least one soluble silicate, the concrete mix also comprising, based on 750 liters of the stabilized wood aggregates: from 200 to 350 kg of sand; from 200 to 350 kg of cement, such as silica fume or Portland cement; from 8 to 15 kg of polymer additive, preferably a melamine-based polymer; from 80 to 175 kg of water; and optionally, at least one pigment such as iron oxide. This block is particularly interesting in that it is lightweight, it has a high bending resistance; it has a pronounced and decorative texture; and it is very porous, thereby making it self-draining and efficient as a sound absorber.

12 Claims, No Drawings

LIGHTWEIGHT BLOCK CONTAINING STABILIZED WOOD AGGREGATES

BACKGROUND OF THE INVENTION a) Field of the Invention

The present invention is broadly concerned with concrete blocks, pavers and tiles adapted for use to complete the construction, decoration and/or "landscaping" of a patio, a garden or any other area subjected to pedestrian traffic.

The invention is more particularly concerned with a block of the above-mentioned type, which is made from a polymer concrete mix containing stabilized wood aggregates and thus is lightweight, and which also has an enhanced mechanical resistance making it particularly efficient for its intended use.

By the expression "a lightweight block" as is used in the present specification, there is meant a block having a density of about 800 to about 1,200 kg/m$^3$, i.e., a block having a bulk density equal to 1±0.2.

b) Brief Description of the Prior Art

Stabilized wood aggregates and their incorporation as additives into a concrete or a mortar for the manufacture insulating construction elements, such as prefabricated walls or floors, are already known. In this connection, reference can be made to Canadian patent No. 1,171,264 granted on Jul. 24, 1984 and to Canadian patent No. 1,203,991 granted on May 6, 1986, both in the name of Société Francaise d'Agrégats Stabilisés.

The first one of these two Canadian patents discloses and claims a process for the manufacture of stabilized wood aggregates, which comprises two basic steps, namely (1) a sterilization of wood chips by thermal treatment in a rotary kiln at a temperature ranging from 400° to 800° C., and (2) a subsequent chemical treatment of the sterilized wood chips to convert them into the required aggregates. This chemical treatment is carried out first by spraying onto the sterilized wood chips a solution of a calcium salt, preferably calcium chloride, until the chips are deeply saturated, and then by spraying onto the same chips a solution of a soluble silicate derivative, preferably potassium silicate, which reacts with the calcium salt to form calcium silicate in situ. This so formed calcium silicate stabilizes the wood fibers by immobilizing the same and thus transforms the wood chips into aggregates that are chemically inert, dimensionally stable, resistant to shivering and long lasting under any kind of climatic conditions, thereby making them useful in the construction field.

In the same Canadian patent, it is disclosed that the so prepared wood aggregates can be used as a "filler" into any kind of mixtures used in the construction field, such as concretes, mortars and the like.

If the concrete mix produced with such stabilized wood aggregates have proved so far to be very useful, especially for insulation purposes, nobody has ever thought of using them for the manufacture of tiles, pavers or other "landscaping" blocks or components capable of withstanding pedestrian traffic, because, so far, all the blocks that were prepared from such a concrete mix and extensively tested have not proved to possess enough bending strength and enough abrasive resistance.

Moreover, for such a very specific application, it is compulsory that the tiles, pavers or blocks have a high porosity to make the area covered by the same self-draining and sound-absorbing at the very same time.

DETAILED DESCRIPTION

In accordance with the invention, it has been found that blocks of the above mentioned type, especially adapted for use in the construction, decoration and landscaping of patios, gardens and other areas subjected to pedestrian traffic, can efficiently be prepared from a concrete mix comprising stabilized wood aggregates, provided that the relative proportions of the various components of the concrete mix remain within some given limits and that one of these components, used in relatively low amount, be a polymer additive.

Indeed, it has been found that, in such a case, one can obtain a block useful as a patio tile, a border piece or landscaping component, which simultaneously:
1—is lightweight;
2—has a high bending resistance;
3—has a pronounced and decorative texture; and
4—is very porous, thereby making it self-draining and efficient as a sound absorber.

The block according to the invention finds use as patio tiles, border pieces and landscaping components, has a density of 800 to 1,200 kg/m$^3$, and is made from a concrete mix comprising stabilized wood aggregates prepared by sterilization of wood chips by thermal treatment, followed by a chemical treatment with a calcium salt first and then with at least one soluble silicate. The concrete mix also comprises, based on 750 liters of said stabilized wood aggregates:

from 200 to 350 kg of sand;
from 200 to 350 kg of cement, such as silica fume or Portland cement;
from 8 to 15 kg of polymer additive, preferably a melamine-based polymer;
from 80 to 175 kg of water; and
optionally, at least one pigment such as iron oxide.

The block according to the invention can be manufactured by mixing together the above ingredients in the usual way. The resulting concrete mix is then poured into a vibrating mold in which one or more blocks can be shaped under pressure. In practice, use can be made of a mold vibrating at a speed of 3,000 to 12,000 Hz and the pressure applied to the concrete mix within the mold can range from 1.5 to 100 kPa. Once the compaction is completed, the shaped block can be unmolded immediately, if desired. Curing of the block may then take from 4 to 24 hours to be completed.

The final density (and porosity) of the so prepared block depends on the respective amount of each ingredient used in the mix and on the level of compaction. In accordance with the invention, it is compulsory that the final density of the block be within the above mentioned range, i.e., between 800 and 1,200 kg/m$^3$.

The stabilized wood aggregates used for preparing the block according to the invention can be prepared as is disclosed in the above mentioned Canadian patent No. 1,171,264. The sand and cement used in the mix can be of any grade presently available in the market and commonly used for similar applications.

In accordance with the invention, it is compulsory that the concrete mix also contains a given amount of a polymer additive. Such is indeed compulsory to improve the bending strength and abrasion resistance of the block and thus make it efficient for its intended use. Any kind of polymer additive used for the preparation of polymer concretes can be used in accordance with the invention. However, use is preferably made of a melamine-based polymer additive like the one sold by the French company CHRYSO under the reference CMB, or of SBR or acrylic polymer.

Tests carried out by the Applicant on lightweight blocks prepared as disclosed hereinabove have proved to be very successful and have shown that the block according to the invention meet all the requirements for their intended use. The tests that were carried out included:
freeze-thaw (75 cycles)
acceleration weathering (500 hrs)
abrasion resistance;
bending strength.

The invention, the way it can be reduced to practice and its advantages will be better understood upon reading of the following non restrictive examples.

EXAMPLE 1

A set of patio tiles was prepared from a concrete mix comprising:
about 750 liters of stabilized wood aggregates prepared as disclosed in Canadian patent No. 1,171,264;
about 265 kg of sand;
about 225 kg of ordinary Portland cement;
about 10 liters of the melamine-based polymer additive sold by CHRYSO under the reference CMB;
about 110 liters of water; and
about 7 kg of iron oxide, used as colouring pigment.

The ingredients were mixed in the usual way. The concrete mix was then transferred to a mold where it was shaped into tiles on a vibrating table. The dimensions of each tile were as follows:
length: 406 mm
width: 406 mm
thickness: 38 mm Their colour was red, like a conventional brick.

Other batches of tiles were prepared in the same way but with other mineral pigment additives, selected to colour them in green, grey, yellow and blue.

The pressure applied to the mix within the mold ranged between 1.5 and 100 kPa and the vibrations were ranging between 3,000 and 12,000 Hz. The tiles were then immediately unmolded and allowed to cure and harden for about 12 hours.

Resistance to Abrasion

The resistance to abrasion of the tiles prepared as disclosed above was measured according to the "Abrasion Resistance of Stone Subjected to Foot Traffic" standard ASTM C 241, and to the "Standard Specification for Marble Dimension Stone (Exterior)" standard ASTM C 503. The results of this measurement were as follows:

TABLE I

| Integral weight (average) | Final weight (average) | Difference in weight | Volumic mass | Abrasion index |
|---|---|---|---|---|
| 78.83 g | 77.10 g | 1.73 g | 1.18 g/c.c. | 7 |

P.S.: The abrasion index is obtained with the following equation:

$$Ha = 10 \times G(2000 + Wi)/2000 \times Wf$$

wherein
Ha is the abrasive index;
G is the volumic mass;
Wi is the initial weight; and
Wf is the final weight.

Resistance to Freeze and Thaw

The resistance to freeze and thaw of five of the above tiles was also measured according to the "Method for sampling and testing brick ad structural clay tile" standard ADTM C 67, paragraph 80. The results of this measurement were as follows:

TABLE II

| Samples | Loss of weight after 50 cycles (%) | Loss of weight after 25 additional cycles (%) | Total loss of weight (%) |
|---|---|---|---|
| 1 | 0.70 | 1.34 | 2.04 |
| 2 | 0.35 | 1.20 | 1.55 |
| 3 | 0.50 | 1.41 | 1.91 |
| 4 | 0.34 | 1.52 | 1.86 |
| 5 | 0.30 | 1.42 | 1.72 |
| average | 0.74 | 1.38 | 1.81 |

It is worth mentioning that after 75 cycles of freeze and thaw, no damage was observed on any of the five tested tiles.

Change in Colour

Tests were also carried out in order to evaluate the change in colour, finish and texture of the above tiles after an accelerated aging according to the "Standard Specification for Prefaced Concrete and Calcium Silicate Masonry Units" standard ASTM C 744 and the "Standard Practice for Conducting Tests on Paint and Related Coating and Materials Using Filtered Open Flame Carbon-Arc Light and Water Exposure Apparatus" standard ADTM D 822.

The tests were carried out for different period of times with a double carbon arc WEATHER-OMETER ® apparatus. The daily cycle that was used, included 8 hours of light, 10 hours of light and water pulverization and 6 hours of water pulverization alone. The results of these tests are reported in Table III.

TABLE III

| | Difference in colour (DeltaE) in judds after treatment | | | | |
|---|---|---|---|---|---|
| Samples | 100 h | 200 h | 300 h | 400 h | 500 h |
| red tiles | 1.35 | 2.83 | 2.13 | 2.99 | 3.77 |
| grey tiles | 0.93 | 0.61 | 0.81 | 0.44 | 1.09 |
| yellow tiles | 1.54 | 2.35 | 2.23 | 3.45 | 3.47 |
| blue tiles | 1.57 | 3.13 | 3.14 | 3.29 | 4.07 |

According to ASTM C 744, the difference in colour to be acceptable, must be lower than 5. As can be appreciated, the tiles according to the invention satisfied this requirement.

EXAMPLE 2

Other tiles according to the invention were prepared, having the following compositions:

| | |
|---|---|
| density of stabilized aggregates | 170 |
| cement (/m³) | 350 |
| sand (/m³) | 275 |
| water to cement ratio | 0.34 |
| polymer additive (CMB of CHRYSO) | 6.2% |

The mixing time was 5 minutes and the density of the tiles that were so prepared was 990 kg/m$^3$.

Bending Resistance

The bending strength of these tiles was measured. The result of such a measurement is as follows:

| | |
|---|---|
| bending strength (7 days) | 1.74 mpa (corresponding to 249 psi) |

The same test carried out with similar tiles without polymer additive has given in bending strength values substantially lower than above.

While this invention has been illustrated and described in accordance with a preferred embodiment, it is recognized that variations and changes may be made therein without departing from the invention as set forth in the claims.

I claim:

1. A porous lightweight block comprising a concrete mix including stabilized wood aggregates prepared by sterilization of wood chips by thermal treatment, followed by a chemical treatment with a calcium salt and, subsequently, with at least one soluble silicate, the concrete mix also including, based on 750 liters of the stabilized wood aggregates:
   about 265 kg of sand;
   about 225 kg of cement;
   about 10 liters of polymer additive; and
   about 110 kg of water.

2. The lightweight block of claim 1, the concrete mix further including a pigment.

3. The lightweight block of claim 2, wherein the concrete mix includes about 7 kg of the pigment.

4. The lightweight block of claim 2, wherein the pigment is iron oxide.

5. The lightweight block of claim 1, wherein the block is a patio tile.

6. The lightweight block of claim 1, wherein the cement is silica fume.

7. The lightweight block of claim 1, wherein the cement is Portland cement.

8. The lightweight block of claim 1, wherein the polymer additive is a melamine-based polymer.

9. The lightweight block of claim 1, wherein the block has a density of between 800 and 1200 kg/m$^3$.

10. A lightweight block that is sufficiently porous to permit drainage of water through the block, the block being formed from a concrete mix consisting essentially of: (a) stabilized wood aggregates prepared by sterilization of wood chips by thermal treatment, followed by a chemical treatment with a calcium salt and, subsequently, with at least one soluble silicate;
    (b) from 200 to 350 kg of sand;
    (c) from 200 to 350 kg of cement;
    (d) from 8 to 15 kg of polymer additive; and
    (e) from 80 to 175 kg of water,
    wherein elements (b)–(e) are based on 750 liters of the stabilized wood aggregates.

11. The lightweight block of claim 10, wherein the concrete mix further includes at least one pigment.

12. The lightweight block of claim 10, wherein the concrete mix includes, based on 750 liters of the stabilized wood aggregates:
    about 265 kg of the sand;
    about 225 kg of the cement;
    about 10 liters of the polymer additive; and
    about 110 kg of the water.

* * * * *